US009571669B2

(12) United States Patent
Peker et al.

(10) Patent No.: US 9,571,669 B2
(45) Date of Patent: Feb. 14, 2017

(54) REVERSE POWER FEEDING SYSTEM AND METHOD

(71) Applicant: Microsemi Corp.—Analog Mixed Signal Group, Ltd., Hod Hasharon (IL)

(72) Inventors: Arkadiy Peker, Glen Cove, NY (US); Eli Ohana, Kfar Sava (IL)

(73) Assignee: Microsemi P.O.E Ltd., Hod Hasharon (IL)

( * ) Notice: Subject to any disclaimer, the term of this patent is extended or adjusted under 35 U.S.C. 154(b) by 0 days.

(21) Appl. No.: 15/132,265

(22) Filed: Apr. 19, 2016

(65) Prior Publication Data
US 2016/0309045 A1    Oct. 20, 2016

Related U.S. Application Data

(60) Provisional application No. 62/149,696, filed on Apr. 20, 2015.

(51) Int. Cl.
*H04M 1/24* (2006.01)
*H04M 3/08* (2006.01)
(Continued)

(52) U.S. Cl.
CPC .............. *H04M 19/08* (2013.01); *H04B 3/44* (2013.01); *H04L 12/10* (2013.01);
(Continued)

(58) Field of Classification Search
CPC ...... H04B 10/806; H04B 3/44; H04J 14/0246; H04J 14/025; H04J 14/0282; H04L 12/10; H04L 12/1885; H04L 12/2898; H04L 12/40045; H04L 41/0833; H04L 12/2878; A01B 12/006
(Continued)

(56) References Cited

U.S. PATENT DOCUMENTS 6,992,404 B2 *  1/2006  Priest .................... H04M 19/08
                                                                    307/52
7,580,732 B2 *  8/2009  Bailey .................... H04M 1/738
                                                                    370/216
(Continued)

FOREIGN PATENT DOCUMENTS

EP    2120443 A1   11/2009
EP    2472792 A2    7/2012
EP    2835934 A1    2/2015

OTHER PUBLICATIONS

Per Karlsson et al., "DC Bus Voltage Control for a Distributed Power System", IEEE Transaction on Power Electronics, vol. 18, No. 6, Nov. 2003, 8 pages, New York, NY.
(Continued)

Primary Examiner — Binh Tieu
(74) Attorney, Agent, or Firm — Simon Kahn

(57) ABSTRACT

A reverse power feeding system for supplying power from a plurality of first devices to a second device, a first set of the plurality of first devices each being powered by a first type power source and a second set of the plurality of first devices each being powered by a second type power source different than the first type power source, the system constituted of: a plurality of power paths, each of the plurality of power paths arranged to transfer DC power between a respective one of the plurality of first devices and the second device; and a control circuitry, the control circuitry arranged to adjust the amount of power supplied by each of the second set of the plurality of first devices over the power paths responsive to the total amount of power supplied by the first set of the plurality of first devices over the power paths.

17 Claims, 6 Drawing Sheets

(51) Int. Cl.
  *H04M 3/22* (2006.01)
  *H04M 1/00* (2006.01)
  *H04M 9/00* (2006.01)
  *H04M 19/08* (2006.01)
  *H04B 3/44* (2006.01)
  *H04L 12/10* (2006.01)
  *H04L 12/28* (2006.01)
  *H04L 12/40* (2006.01)
  *H04B 10/80* (2013.01)

(52) U.S. Cl.
  CPC .... *H04L 12/2878* (2013.01); *H04L 12/40045* (2013.01); *H04B 10/808* (2013.01)

(58) Field of Classification Search
  USPC ............ 379/1.01, 9, 9.05, 9.06, 10.01, 15.01,379/15.03, 22, 22.02, 24, 27.01, 27.06, 29.01,379/29.03, 29.04, 32.01, 32.04
  See application file for complete search history.

(56) References Cited

U.S. PATENT DOCUMENTS

| | | | | |
|---|---|---|---|---|
| 8,552,589 B2* | 10/2013 | Ghosh | ............ | H02J 9/062 307/64 |
| 8,601,289 B1 | 12/2013 | Smith et al. | | |
| 8,818,192 B1* | 8/2014 | Smith | ............ | H04B 10/808 398/171 |
| 8,861,554 B1* | 10/2014 | Schneider | ............ | H04L 12/2861 370/392 |
| 8,963,367 B2* | 2/2015 | Melamed | ............ | H04L 12/10 307/18 |
| 9,319,537 B2* | 4/2016 | Peker | ............ | H04M 19/003 |
| 9,380,152 B2* | 6/2016 | Joffe | ............ | H04M 3/2209 |
| 2004/0049321 A1* | 3/2004 | Lehr | ............ | G06F 1/26 700/286 |
| 2007/0003053 A1* | 1/2007 | Mathoorasing | ............ | H04M 19/008 379/413 |
| 2011/0064212 A1* | 3/2011 | Cooper | ............ | H04M 19/08 379/307 |
| 2012/0250840 A1* | 10/2012 | Joffe | ............ | H04M 11/062 379/90.01 |
| 2012/0300817 A1* | 11/2012 | Smith | ............ | H04L 12/2892 375/219 |
| 2013/0251114 A1* | 9/2013 | Humphrey | ............ | H04M 1/738 379/30 |
| 2014/0314412 A1* | 10/2014 | Soto | ............ | H04L 12/2898 398/67 |
| 2015/0334226 A1* | 11/2015 | Peker | ............ | H04M 19/08 379/1.03 |
| 2016/0164687 A1* | 6/2016 | Cooper | ............ | H04L 12/10 307/1 |
| 2016/0330334 A1* | 11/2016 | Cooper | ............ | H04M 19/08 |

OTHER PUBLICATIONS

"Access, Teminals, Transmission and Multiplexing (ATTM): Reverse Power Fee for Remote Nodes"; ETSI TR 629 V2. 1.2, Mar. 1, 2011, 24 pages.

International Search Report for parallel PCT/IL2016/050406 issued Jul. 21, 2016 by European Patent Office.

Written Opinion of the International Searching Authority for parallel PCT/IL2016/050406 issued Jul. 21, 2016 by European Patent Office.

* cited by examiner

| | |
|---|---|
| 1000 | RECEIVE REPRESENTATION OF CURRENT MAGNITUDE IN SECONDARY WINDINGS ASSOCIATED WITH FIRST SET OF FIRST DEVICES POWERED BY A FIRST TYPE POWER SOURCE, SECONDARY WINDINGS IN ELECTRICAL COMMUNICATION WITH SECOND DEVICE, OPT. FIRST TYPE POWER SOURCE COMPRISES AN AC POWER MAINS |
| 1010 | RESPONSIVE TO RECEIVED REPRESENTATIONS, CONTROL SWITCHES OF PRIMARY WINDINGS ASSOCIATED WITH SECOND SET OF FIRST DEVICES, POWERED BY A SECOND TYPE POWER SOURCE, SUCH THAT GENERATED CURRENT MAGNITUDE IS REDUCED, OPT. SECOND TYPE POWER SOURCE COMPRISES A RESERVE POWER SOURCE |
| 1020 | (OPT.) GENERATE CURRENT IN SECONDARY WINDINGS ASSOCIATED WITH SECOND SET OF FIRST DEVICES ONLY IF SUM OF CURRENT MAGNITUDES ASSOCIATED WITH FIRST SET OF FIRST DEVICES < PREDETERMINED VALUE, OPT. SUPPLY ONLY DIFFERENCE BETWEEN DPU REQUIREMENTS AND MAGNITUDE SUM ASSOCIATED WITH FIRST SET |
| 1030 | (OPT.) BALANCE CURRENT IN SECONDARY WINDINGS ASSOCIATED WITH SECOND SET OF FIRST DEVICES TO BE SUBSTANTIALLY EQUAL, OPT. RESPONSIVE TO COMPARISON OF CURRENT MAGNITUDE IN EACH SECOND SET ASSOCIATED SECONDARY WINDING WITH AVERAGE CURRENT MAGNITUDE IN SECOND SET ASSOCIATED SECONDARY WINDINGS |
| 1040 | (OPT.) BALANCE CURRENT IN SECONDARY WINDINGS ASSOCIATED WITH FIRST SET OF FIRST DEVICES TO BE SUBSTANTIALLY EQUAL, OPT. RESPONSIVE TO COMPARISON OF CURRENT MAGNITUDE IN EACH FIRST SET ASSOCIATED SECONDARY WINDING WITH AVERAGE CURRENT MAGNITUDE IN FIRST SET ASSOCIATED SECONDARY WINDINGS |

FIG. 5

REVERSE POWER FEEDING SYSTEM AND METHOD

BACKGROUND

Various communication standards, such as digital subscriber line (xDSL), very-high-bit-rate digital subscriber line 2 (VDSL2), G.hn, and G.fast, have been proposed or developed to provide high-speed data transmission from the service provider (e.g., a central office) to a customer premise over the existing twisted-pair copper wiring conventionally used for telephone service. Such technologies leverage modem technology to increase the data transfer bandwidth of the twisted-pair copper wiring. Typically, modems are provided on the ends of the subscriber line copper wiring to communicate between the central office and the customer premise. The manner in which the two modems communicate is established by the particular standard governing the communication. Because the existing telephone wire is used, the data signals are typically transferred out-of band with the voice band signals. Because different frequencies are used for the voice band and the data band, voice and data information can be concurrently transferred over the twisted-pair copper line.

Service providers have increased data bandwidth by installing fiber optic cabling between the central office and a distribution point unit (DPU) closer to the customers. A particular DPU may interface with a bundle of twisted pairs to service a relatively small number of customer premise connections. This approach shortens the length of the copper pair between the CO interface at the DPU and the customer, thereby allowing increased data rates. Thus the DPU will provided telephony and/or data to one or more customer premises equipment (CPE)

One difficulty arising from an optical connection between the central office and the DPU lies in the inability to provide a source of power for the DPU. Due to the remoteness of the DPU with respect to the central office, a local power supply is often unavailable or expensive to install.

Powering for a DPU may be provided by reverse power feeding, wherein power is supplied to the DPU from the various CPEs for which telephony and/or data services are provided from the DPU. A standard for reverse power feeding is being standardized by ETSI and the Broadband World Forum. In such an embodiment, a power supply in the DPU combines power contributions from multiple CPEs to power a main distribution unit (MDU) that handles the voice and data communication. This arrangement is referred to as a reverse power system, since the CPEs are the power sourcing equipment (PSE) and the DPU, particularly the MDU, is the powered device (PD).

During a power outage at some of the customer premises, the respective CPE will be powered by a battery. Supplying power to the DPU in such a case will drain the battery, which is undesirable. However, in the absence of reverse power, the MDU will have no source of power and thus will be unable to supply telephony or data services to all attached CPEs.

SUMMARY OF THE INVENTION

Accordingly, it is a principal object of the present invention to overcome at least some of the disadvantages of prior art reverse power systems. This is accomplished in one embodiment by a reverse power feeding system for supplying power from a plurality of first devices to a second device, a first set of the plurality of first devices each being powered by a first type power source and a second set of the plurality of first devices each being powered by a second type power source different than the first type power source, the system comprising: a plurality of power paths, each of the plurality of power paths arranged to transfer DC power between a respective one of the plurality of first devices and the second device; and a control circuitry, the control circuitry arranged to adjust the amount of power supplied by each of the second set of the plurality of first devices over the plurality of power paths responsive to the total amount of power supplied by the first set of the plurality of first devices over the power paths.

In one further embodiment, in the event that the total amount of power supplied by the first set of the plurality of first devices is not sufficient to power the second device, power is further supplied over the plurality of power paths to the second device by the second set of the plurality of first devices, and wherein in the event that the total amount of power supplied by the first set of the plurality of first devices is sufficient to power the second device, power is not supplied over the plurality of power paths to the second device by the second set of the plurality of first devices. In another further embodiment the arrangement of the control circuitry to adjust the amount of power supplied by each of the second set of the plurality of first devices over the plurality of power paths is such that the total amount of power supplied by the second set of the plurality of first devices over the plurality of power paths is substantially equal to the difference between the amount of power needed by the second device and the total amount of power supplied by the first set of the plurality of first devices over the plurality of power paths.

In one further embodiment, the system further comprises a balancer circuitry, the balancer circuitry arranged to: balance the power supplied by each of the second set of the plurality of first devices to be substantially equal to each other; and balance the power supplied by each of the first set of the plurality of first devices to be substantially equal to each other. In one yet further embodiment, the balancer circuitry is further arranged to: compare a representation of the amount of power supplied be each of the second set of the plurality of first devices with a representation of the average amount of power supplied by the second set of the plurality of first devices, the arrangement to balance the power supplied by each of the second set of the plurality of first devices responsive to the second set comparison; and compare a representation of the amount of power supplied be each of the first set of the plurality of first devices with a representation of the average amount of power supplied by the first set of the plurality of first devices, the arrangement to balance the power supplied by each of the first set of the plurality of first devices responsive to the first set comparison.

In one further embodiment the first type power source comprises an AC power mains, and wherein the second type power source comprises a reserve power source. In another further embodiment, the control circuitry is further arranged to receive an indication of which of the plurality of first devices belong to the first set of the plurality of first devices and which of the plurality of first devices belong to the second set of the plurality of first devices, the arrangement of the control circuitry to adjust the amount of power supplied by the second set of the plurality of first devices over the plurality of power paths responsive to the received indication.

Independently, the embodiments herein provide for a method of reverse power feeding for supplying power from a plurality of first devices to a second device, a first set of the plurality of first devices each being powered by a first type power source and a second set of the plurality of first devices each being powered by a second type power source different than the first type power source, the method comprising: transferring direct-current (DC) power between a respective one of the plurality of first devices and the second device; and adjusting the amount of power supplied by each of the second set of the plurality of first devices responsive to the total amount of power supplied by the first set of the plurality of first devices.

In one further embodiment, in the event that the total amount of power supplied by the first set of the plurality of first devices is not sufficient to power the second device, further supplying power to the second device by the second set of the plurality of first devices, and wherein in the event that the total amount of power supplied by the first set of the plurality of first devices is sufficient to power the second device, not supplying power to the second device by the second set of the plurality of first devices. In another further embodiment the adjusting the amount of power supplied by each of the second set of the plurality of first devices is such that the total amount of power supplied by the second set of the plurality of first devices is substantially equal to the difference between the amount of power needed by the second device and the total amount of power supplied by the first set of the plurality of first devices.

In one further embodiment, the method further comprises: balancing the power supplied by each of the second set of the plurality of first devices to be substantially equal to each other; and balancing the power supplied by each of the first set of the plurality of first devices to be substantially equal to each other. In one yet further embodiment the method further comprises: comparing a representation of the amount of power supplied by each of the second set of the plurality of first devices with a representation of the average amount of power supplied by the second set of the plurality of first devices, the balancing the power supplied by each of the second set of the plurality of first devices responsive to the second set comparison; and comparing a representation of the amount of power supplied be each of the first set of the plurality of first devices with a representation of the average amount of power supplied by the first set of the plurality of first devices, the balancing the power supplied by each of the first set of the plurality of first devices responsive to the first set comparison.

In one further embodiment, the first type power source comprises an AC power mains, and wherein the second type power source comprises a reserve power source. In another further embodiment, the method further comprises receiving an indication of which of the plurality of first devices belong to the first set of the plurality of first devices and which of the plurality of first devices belong to the second set of the plurality of first devices, the adjusting the amount of power supplied by the second set of the plurality of first devices over the plurality of power paths responsive to the received indication.

Independently, the embodiments herein provide for a reverse power feeding system for supplying power from a plurality of first devices to a second device, a first set of the plurality of first devices each being powered by a first type power source and a second set of the plurality of first devices each being powered by a second type power source different than the first type power source, the system comprising: a control circuitry; a plurality of transformers, each of the plurality of transformers exhibiting a primary winding and a secondary winding magnetically coupled to the primary winding, the primary winding in electrical communication with a respective one of the plurality of first devices and second secondary winding in electrical communication with the second device; and a plurality of electronically controlled switches, each of the plurality of electronically controlled switches in electrical communication with the primary winding of a respective one of the plurality of transformers and arranged to be alternately opened and closed responsive to the control circuitry, wherein the control circuitry is arranged to: receive a representation of the magnitude of a current generated in the secondary winding of the transformers associated with the first set of the plurality of first devices; and responsive to the received current magnitude representations, control each of the electronically controlled switches associated with the second set of the plurality of first devices to reduce the magnitude of a current generated in the associated secondary windings.

In one further embodiment, in the event that the sum of the magnitudes of currents generated in the secondary windings associated with the first set of the plurality of first devices is less than a predetermined value, current is generated in each of the secondary windings associated with the second set of the plurality of first devices, and wherein in the event that the sum of the magnitudes of currents generated in the secondary windings associated with the first set of the plurality of first devices is not less than the predetermined value, current is not generated in each of the secondary windings associated with the second set of the plurality of first devices. In another further embodiment the magnitude current reduction is such that the sum of the magnitudes of currents generated in the secondary windings associated with the second set of the plurality of first devices is substantially equal to the difference between the current magnitude needed by the second device and the sum of the magnitudes of currents generated in the secondary windings associated with the first set of the plurality of first devices.

In one further embodiment the system further comprises a balancer circuitry, the balancer circuitry arranged to: balance the current generated in each of the secondary windings associated with the second set of the plurality of first devices to be substantially equal to each other; and balance the current generated in each of the secondary windings associated with the first set of the plurality of first devices to be substantially equal to each other. In one yet further embodiment the balancer circuitry is further arranged to: compare a representation of the magnitude of current generated in each of the secondary windings associated with the second set of the plurality of first devices with a representation of the average magnitude of current generated in the secondary windings associated with the second set of the plurality of first devices, the arrangement to balance the current generated by each of the secondary windings associated with the second set of the plurality of first devices responsive to the second set comparison; and compare a representation of the magnitude of current generated in each of the secondary windings associated with the first set of the plurality of first devices with a representation of the average magnitude of current generated in the secondary windings associated with the first set of the plurality of first devices, the arrangement to balance the current generated by each of the secondary windings associated with the first set of the plurality of first devices responsive to the second set comparison.

In one further embodiment the first type power source comprises an AC power mains, and wherein the second type power source comprises a reserve power source.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. The term 'resistor' as used herein is meant to include, without limitation, any suitable element providing electrical resistance. The term 'inductor' as used herein is meant to include, without limitation, any suitable element providing electrical inductance. The term 'capacitor' as used herein is meant to include, without limitation, any suitable element providing electrical capacitance. In the accompanying drawings:

FIG. 5 illustrates a high level flow chart of a first reverse power feeding method, according to certain embodiments.

DETAILED DESCRIPTION OF THE PREFERRED EMBODIMENTS

Figure 1:
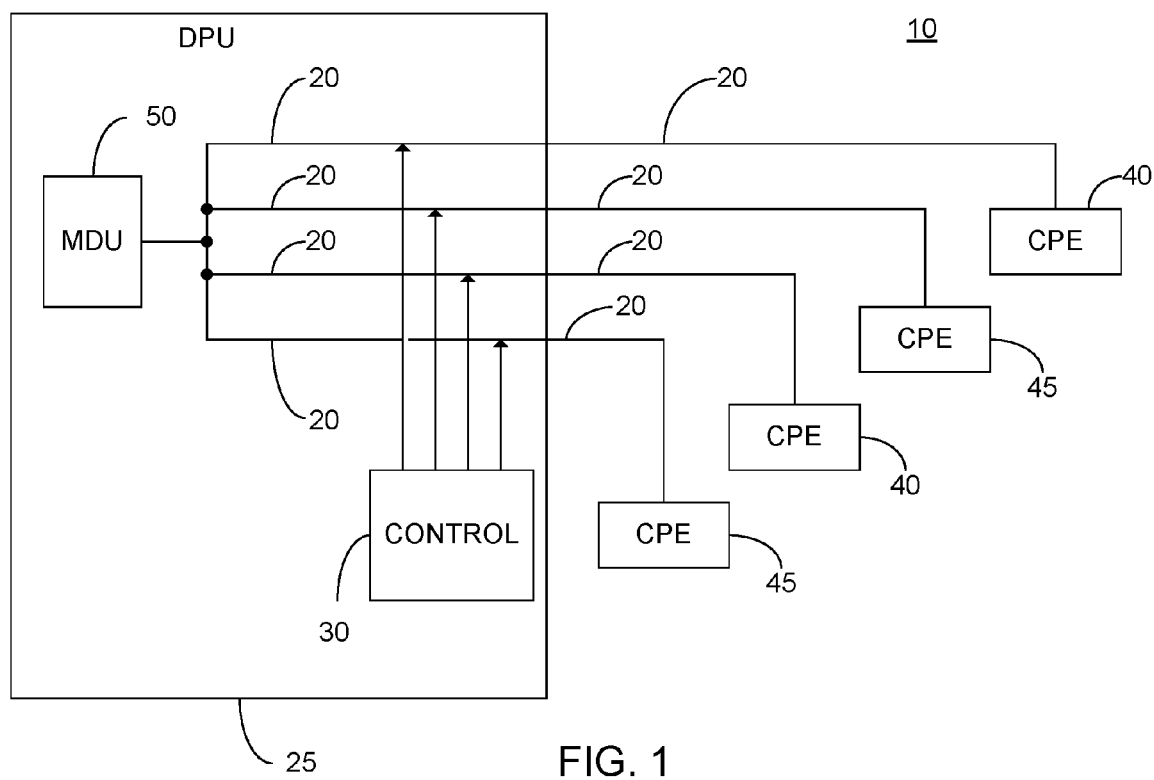
FIG. 1 illustrates a high level block diagram of a first embodiment of a reverse power feeding system, according to certain embodiments.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 illustrates a high level block diagram of a reverse power feeding system 10, comprising: a plurality of power paths 20; a plurality of CPEs 40, 45; and a DPU 25 comprising a control circuitry 30 and an MDU 50. A first end of each power path 20 is arranged to receive DC power from a respective one of CPE 40, 45 and the second ends of power paths 20 are commonly coupled in a power sharing arrangement, within DPU 25, and further arranged to provide shared power to MDU 50. Each power path 20 is arranged to transfer the DC power received from the respective CPE 40, 45 to MPU 50 via a power sharing connection in DPU 25. Each CPE 40, 45 is located in a respective one of a plurality of customer premises, and during a power outage in some of the customer premises, the respective CPEs 45 will be powered by a battery, while the remainder of CPEs 40 are powered by a power mains. Particularly, CPEs 40 are each defined as a CPE being powered by a first type power source, optionally an AC power mains, and CPEs 45 are each defined as a CPE being powered by a respective second type power source, optionally a reserve power source. CPEs 40 and 45 are denoted as such, however this is not meant to be limiting in any way. Each CPE 40 may at any point lose main power, thereby being powered by the second type power source, i.e. becoming a CPE 45, and each CPE 45 may at any point regain main power, thereby being powered by the first type power source, i.e. becoming a CPE 40.

Control circuitry 30 is arranged to receive an indication which of CPEs 40, 45 are powered by the first type power source, i.e. are CPEs 40, and which of CPEs 40, 45 are powered by the second type power source, i.e. are CPEs 45. Responsive to the received indication, control circuitry 30 is arranged to adjust the amount of power drawn from CPEs 45. Particularly, control circuitry 30 is arranged to determine whether the total amount of power supplied by CPEs 40 is sufficient to power MDU 50. The power supplied by each CPE 40 is limited to a predetermined maximum, and power in excess of the predetermined maximum is not to be drawn. In the event that the amount of power supplied by CPEs 40 is sufficient to power MDU 50, control circuitry 30 is arranged to the adjust power paths 20 associated with CPEs 45 such that no power is supplied thereby. In other words, power is supplied only by the CPEs 40 which are receiving power from a power mains and no power is drawn from CPEs 45 which are being powered by a reserve power source. In the event that the amount of power supplied by CPEs 40 is not sufficient to power MDU 50, control circuitry 30 is arranged to adjust the power paths 20 associated with CPEs 45 such that power is further supplied to MDU 50 from CPEs 45. In one embodiment, only the difference between the amount of power supplied by CPEs 40, at their maximum allowed power draw, and the amount of power necessary to power MDU 50 is supplied by CPEs 45, as described in EQ. 1:

$$P_{CPE45} = P_{DPU} - P_{CPE40} \qquad \text{EQ. 1}$$

where $P_{CPE45}$ is the amount of power supplied by all of the CPEs 45, $P_{DPU}$ is the amount of power which is needed to power MDU 50 and $P_{CPE40}$ is the amount of power supplied by all of the CPEs 40, CPEs 40 supplying the maximum amount of allowed power in accordance with the respective protocol.

In one embodiment, control circuitry 30 is further arranged to control the power paths 20 associated with CPEs 45 such that the amount of power supplied by CPEs 45 are substantially equal to each other. In another embodiment, control circuitry 30 is further arranged to control the power paths 20 associated with CPEs 40 such that the amount of power supplied by CPEs 40 are substantially equal to each other.

Figure 2:
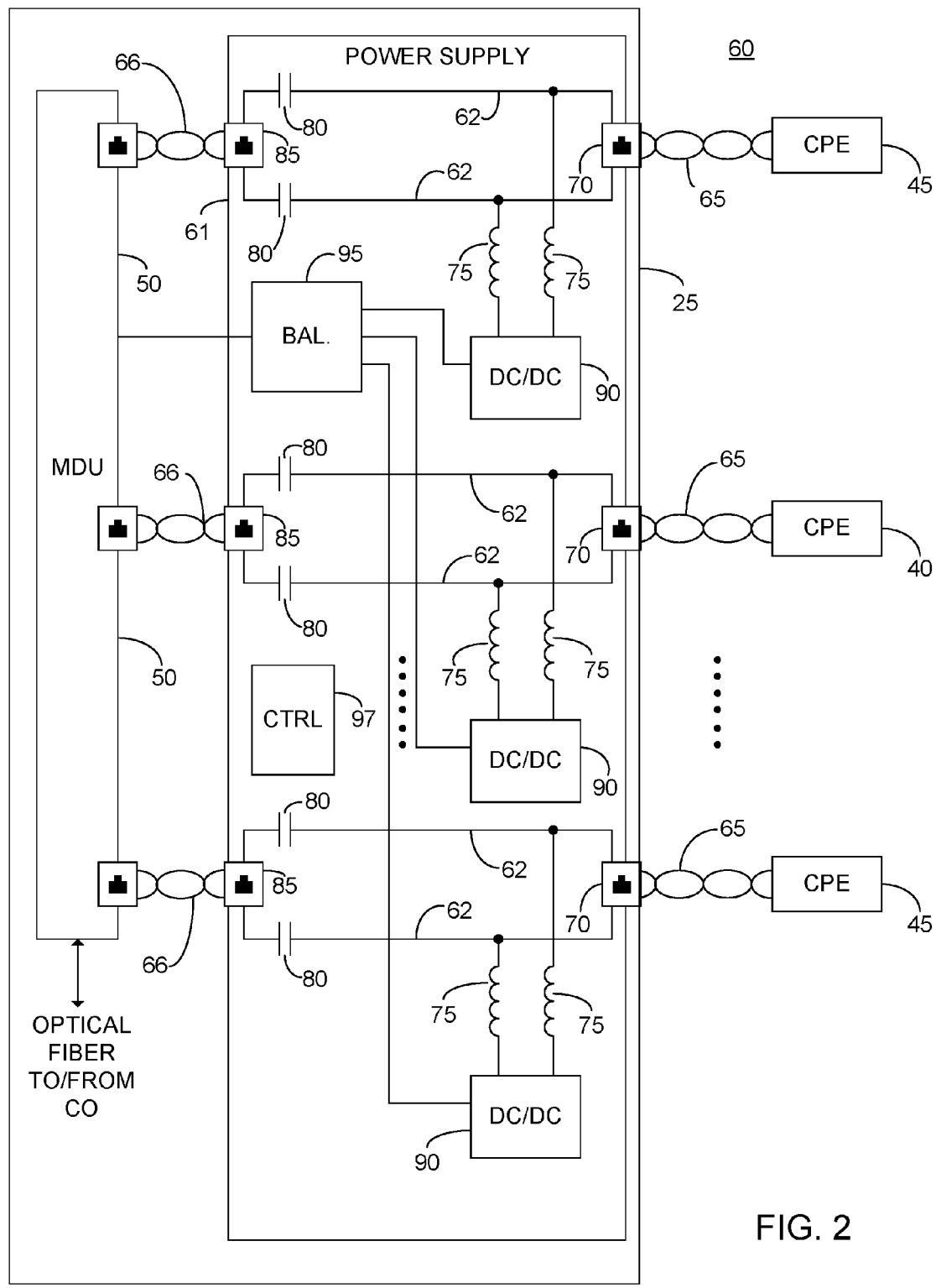
FIG. 2 illustrates a high level block diagram of a second embodiment of a reverse power feeding system, according to certain embodiments.

FIG. 2 illustrates a high level schematic diagram of a reverse power feeding system 60, comprising: a DPU 25 comprising an MDU 50, a power supply 61, a plurality of input ports 70 and a plurality of data connections 66; a plurality of CPEs 40; a plurality of CPEs 45; and a plurality of twisted wire pairs 65. Data connections 66 may be constituted of twisted wire pairs, or may be circuit board connections without limitation. Power supply 61 comprises: a plurality of wires 62; a plurality of inductors 75; a plurality of capacitors 80; a plurality of output ports 85; a plurality of DC/DC converters 90; a power balancer circuit 95; and a control circuitry 97. Each respective CPE 40, 45 is coupled to a respective input port 70 via a respective twisted wire pair 65, comprising a telephony pair, and each output port 85 is coupled to MDU 50 at a respective port via a respective data connection 66. Each input port 70, which represents both the input port to MDU 50 and power supply 61, is coupled to a respective output port 85 of power supply 61 via a respective pair of wires 62. Each capacitor 80 is disposed within a respective wire 62 and a first end of each inductor 75 is coupled to a respective wire 62 between the respective input port 70 and capacitor 80. A second end of each inductor 75 is coupled to a respective input of a respective DC/DC converter 90, i.e. each DC/DC converter 90 is coupled to a pair of wires 62 via a pair of inductors 75. The output of each DC/DC converter 90 is coupled to a respective input of power balancer circuit 95 and the output of power balancer circuit 95 is coupled to a power input connection of MDU 50. Control circuitry 97 is coupled to power balancer circuit 95 and each DC/DC converter 90, the connections not shown for clarity.

In operation, DC power is output by each CPE 40 and CPE 45 over the respective data wire pair 65, and data signals are transmitted directionally thereon. As described above, CPEs 40 are each powered by a first type power source, optionally an AC power mains, and CPEs 45 are each powered by a second type power source, optionally a reserve power source. The DC power is extracted from the respective wires 62 via the respective inductors 75 and the AC data signals are passed through to MDU 50 via the respective output port 85, the respective capacitor 80 arranged to block DC current from reaching output port 85. The extracted DC power is received by the respective DC/DC converter 90. The DC power extraction is described herein as being performed by inductors 75, however this is not meant to be limiting in any way and any suitable power extraction circuit which does not affect the data throughput between MDU 50 and CPE 40, 45 is specifically contemplated without exceeding the scope.

Control circuitry 97 is arranged to receive a signal from MDU 50 (connection not shown) indicating whether it is a CPE 40 or a CPE 45. Alternately, control circuitry 97 may receive a signal directly from the respective CPEs 40, 45. In another embodiment the voltage output by CPE 40 is higher than the voltage output by CPE 45, and thus respective DC/DC converters 90 detect the voltage levels at their inputs, compare the voltage to a reference, and output a signal to control circuitry 97 indicating whether the connected CPE is a CPE 40 or CPE 45. Alternative, a component of the output of the respective DC/DC converters may be examined to detect whether the connected CPE is a CPE 40 or CPE 45. In the event that the total amount of DC power supplied by CPEs 40 is sufficient to power MDU 50, control circuitry 97 is arranged to control the DC/DC converter 90 associated with each CPE 45 such that DC power is not supplied therefrom to MDU 50. The limited amount of power being supplied to each of CPEs 45 is thus not unnecessarily wasted on MDU 50. In the event that the total amount of DC power supplied by CPEs 40 is insufficient to power MDU 50, control circuitry 97 is arranged to control the DC/DC converter 90 associated with each CPE 45 such that DC power is supplied therefrom to MDU 50, via power balancer circuit 95. As described above in relation to EQ. 1, in one embodiment only the difference between the total amount of power supplied by CPEs 40 and the amount of power required by MDU 50 is supplied by CPEs 45. Control circuitry 97 is arranged to control the respective DC/DC converter 90 associated with each CPE 45 such that the amount of power supplied by each of the various CPEs 45 to MDU 50 are substantially equal to each other, and preferably less than the amount of power supplied by CPEs 40. In one embodiment, control circuitry 97 is further arranged to control the DC/DC converter 90 associated with each CPE 40 such that the amount of power supplied by CPEs 40 to MDU 50 are substantially equal to each other.

Figure 3:
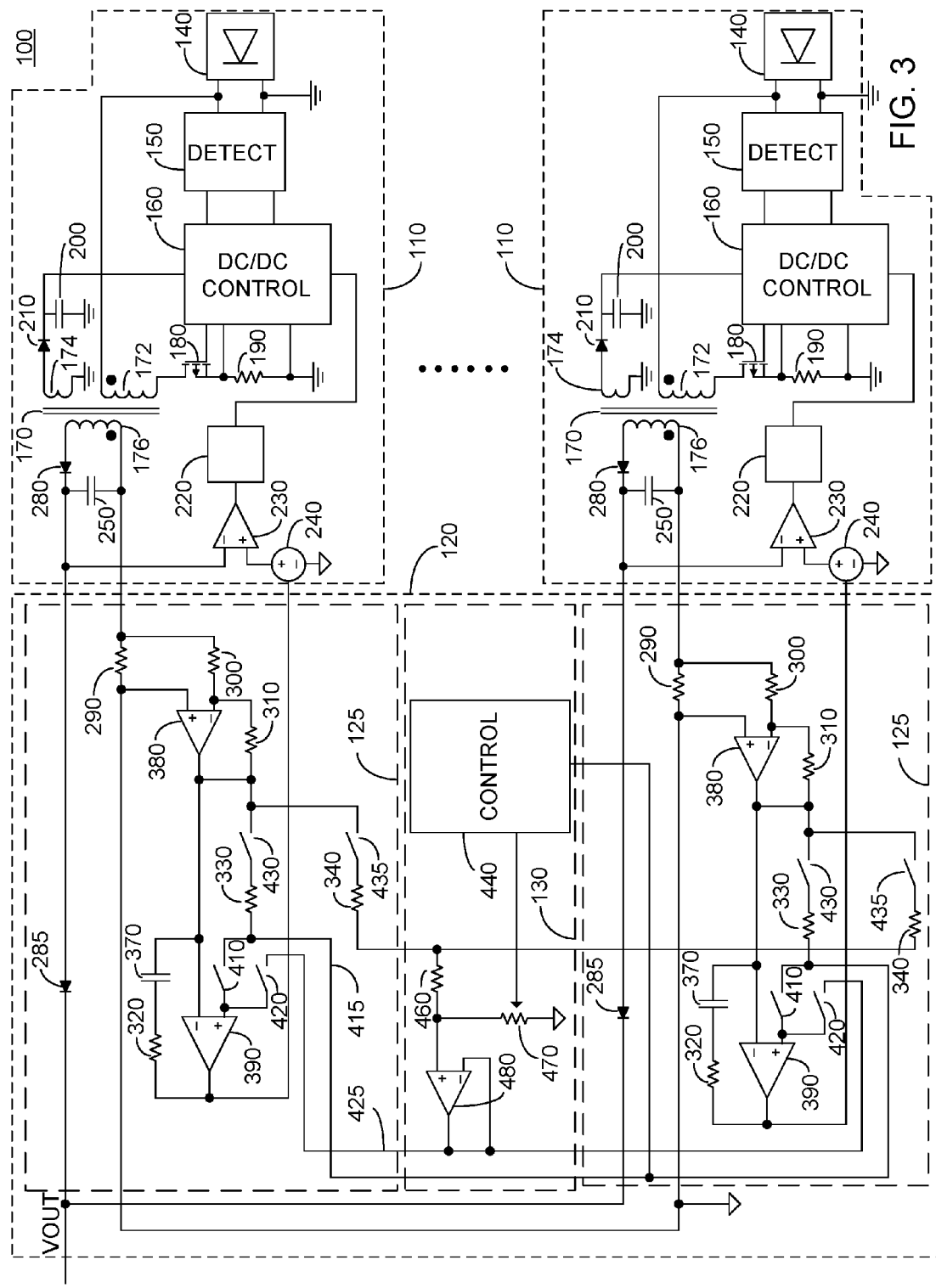
FIG. 3 illustrates a high level block diagram of a power supply for a reverse power feeding system, according to certain embodiments.

FIG. 3 illustrates a high level schematic diagram of a power supply 100, comprising: a plurality of power transfer circuits 110; and a power balancing/control circuit 120. Each power transfer circuits 110 comprises: a diode bridge 140; a detection circuit 150; a DC/DC controller 160; a transformer 170 exhibiting a primary winding 172, a bias winding 174 and a secondary winding 176; an electronically controlled switch 180; a resistor 190; a capacitor 200; a diode 210; an isolation circuit 220; an error amplifier 230; a reference voltage source 240, arranged to output a reference voltage VREF; a capacitor 250; and a diode 280. Power balancing/control circuit 120 comprises: a plurality of current sharing modules 125; and a control circuitry 130. Each current sharing module 125 comprises: a diode 285; a plurality of resistors 290, 300, 310, 320, 330 and 340; a capacitor 370; a current sense amplifier 380; a current sense error amplifier 390; a first bus electronically controlled switch 410; a second bus electronically controlled switch 420; an electronically controlled switch 430; and an electronically controlled switch 435. Control circuitry 130 comprises: a control unit 440; a resistor 460; a variable resistor 470; and a buffer 480. In one embodiment, error amplifier 230, current sense amplifier 380, current sense error amplifier 390 and buffer 480 each comprise an operational amplifier (op-amp) and are described herein as such. In another embodiment, isolation circuit 220 comprises an opto-isolator.

The inputs of diode bridge 140 are arranged to receive power from a respective one of a plurality of CPEs 40 and 45, as described above in relation to reverse power feeding system 60 of FIG. 2 (CPEs 40, 45 not shown), preferably extracted from a twisted wire pair by a transformer (not shown). An output and return of diode bridge 140 are each coupled to DC/DC controller 160 via detection circuit 150. The output of diode bridge 140 is further coupled to a first end of primary winding 172 of transformer 170, the polarity of primary winding 172 denoted by a dot. The return of output bridge 140 is coupled to a primary side common potential. The second end of primary winding 172 is coupled to a first terminal of electronically controlled switch 180 and a second terminal of electronically controlled switch 180 is coupled to the primary side common potential, via resistor 190. The ends of resistor 190 are further coupled to respective inputs of DC/DC controller 160. A first end of bias winding 174 of transformer 170 is coupled to a first end of capacitor 200 and to a respective input of DC/DC controller 160, via diode 210. A second end of bias winding 174 and a second end of capacitor 200 are each coupled to the primary side common potential. A first end of secondary winding 176 of transformer 170 is coupled to the anode of diode 280, and the cathode of diode 280 is coupled to a first end of capacitor 250 and an inverting input of error amplifier 230. A non-inverting input of error amplifier 230 is coupled to the output of reference voltage source 240 and an output of error amplifier 230 is coupled to an input of isolation circuit 220. An output of isolation circuit 220 is coupled to an input of transformer control circuitry 160. A second end of secondary winding 176, the polarity denoted by a dot, is coupled to a second end of capacitor 250.

The first end of capacitor 250 is further coupled to the anode of diode 285 of a respective current sharing module 125 and the cathode of diode 285 is coupled to a MDU 50 (not shown), a respective input of control unit 440 and the cathode of diode 285 of each of the plurality current sharing modules 125, the node denoted VOUT. The second end of capacitor 250 is further coupled to a first end of resistor 290 and a first end of resistor 300. A second end of resistor 290 is coupled to a non-inverting input of current sense amplifier 380 and a secondary side common potential. A second end of resistor 300 is coupled to an inverting input of current sense amplifier 380 and a first end of resistor 310. A second end of resistor 310 is coupled to an output of current sense amplifier 380, a first terminal of electronically controlled switch 430, a first terminal of electronically controlled switch 435, an inverting input of current sense error amplifier 390 and a first end of capacitor 370. A second end of capacitor 370 is coupled to a first end of resistor 320, and a second end of resistor 320 is coupled to an output of current sense error amplifier 390 and a control input of reference voltage source 240. A second terminal of electronically controlled switch 430 is coupled to a first end of resistor 330 and a second terminal of electronically controlled switch 435 is coupled to a first end of resistor 340. A second end of resistor 330 is coupled to a first terminal of first bus electronically controlled switch 410, to the second of resistor 330 of each of the plurality of current sharing modules 125 and to an input of control unit 440, the bus denoted 415. A second terminal of first bus electronically controlled switch 410 is coupled to a non-inverting input of current sense error amplifier 390 and to a first terminal of second bus electronically controlled switch 420. A second terminal of second bus electronically controlled switch 420 is coupled to the output of buffer 480 of control circuitry 130, the bus denoted 425.

A second end of resistor 340 is coupled to a first end of resistor 460 of control circuitry 130. A second end of resistor 460 is coupled to a first end of variable resistor 470 and a non-inverting input of buffer 480. A second end of variable resistor 470 is coupled to the secondary side common potential, variable resistor 470 exhibiting an adjustable resistance controlled by control unit 440. An inverting input of buffer 480 is coupled to the output of buffer 480.

A control input of each of first bus electronically controlled switch 410, second bus electronically controlled switch 420 and electronically controlled switches 430 and 435 is coupled to a respective output of control unit 440, the connections not shown for clarity.

In operation, for each power transfer circuit 110, detection circuit 150 enables a PSE within the respective CPE 40 or 45 to identify the presence of a valid PD, in this case a valid power transfer circuit 110. Such detection may not be required. Responsive to the valid detection, the PSE of the respective CPE 40 or 45 is arranged to provide DC power to the respective power transfer circuit 110, as described above in relation to reverse power feeding system 60 of FIG. 2. In one embodiment, following valid detection, detection circuit 150 is disabled to avoid wasted power. Optionally, a classification circuit is further supplied (not shown) which provides the PSE of the respective CPE 40 or 45 with the respective power drawing information of the power transfer circuit 110. The DC power is received at diode bridge 140, which rectifies the input DC power, thus ensuring polarity neutrality, and the rectified DC power is transferred to primary winding 172 of transformer 170. DC/DC controller 160 controls electronically controlled switch 180 to alternately open and close such that transformer 170 outputs a predetermined DC voltage at secondary winding 176, the output voltage stored across capacitor 250. The value of the DC voltage output at secondary winding 176 may differ from that received at diode bridge 140 without exceeding the scope. Bias winding 174 generates a bias voltage across capacitor 200 to provide a bias for DC/DC controller 160 and the switching of electronically controlled switch 180 is adjusted responsive to a voltage representation of the current of primary winding 172 across resistor 190, and responsive to control unit 440 as will be explained further below.

The output voltage across capacitor 250 is compared to voltage VREF, output by reference voltage source 240, by error amplifier 230. In the event that the output voltage is greater than VREF, the output of error amplifier 230 decreases which is received by DC/DC controller 160 via isolation circuit, thereby controlling to reduce the on/off ratio of electronically controlled switch 180, 220. In the event that the output voltage is less than VREF, the output of error amplifier 230 increases which is received by DC/DC controller 160 via isolation circuit, thereby controlling DC/DC controller 160 to increase the on/off ratio of electronically controlled switch 180.

A voltage representation of the current generated within secondary winding 176, flowing across resistor 290, is amplified by current sense amplifier 380 responsive to the resistance values of resistors 300 and 310. Control unit 440 is arranged to open electronically controlled switches 430 and 435 of the respective current sharing modules 125 when DC power is not being provided by the respective CPE 40, 45 and close one of electronically controlled switches 430 and 435 when DC power is being provided by the respective CPE 40, 45, as will be described further. In one embodiment (not shown), control unit 440 is arranged to detect the voltage across capacitor 250 of each power transfer circuits 110 and determine whether DC power is being provided by the associated CPE 40, 45 responsive to a detected voltage, or lack thereof.

Control unit 440 is arranged to receive a signal indicating which power transfer circuits 110 are receiving power from a CPE 40, i.e. a CPE being powered with a first type power source such as an AC power mains, and which power transfer circuits 110 are receiving power from a CPE 45, i.e. a CPE being powered with a second type power source such as a DC battery. In one embodiment, the signal is received directly from the CPEs 40, 45, over the respective twisted wire pairs. In another embodiment, the signal is received from an external source. In the event that the respective power transfer circuits 110 is drawing power from a CPE 40, electronically controlled switch 430 is closed and electronically controlled switch 435 is open. In the event that the respective power transfer circuits 110 is drawing power from a CPE 45, electronically controlled switch 430 is open and electronically controlled switch 435 is closed. Responsive to a closed state of electronically controlled switch 430, the output of current sense amplifier 380 is presented to bus 415 via resistor 330. Responsive to a closed state of electronically controlled switch 435, the output of current sense amplifier 380 is presented to bus 425, via resistors 340, 460 and 470, and buffer 480.

In the event that the DC power is being supplied by a CPE 40, control unit 440 is arranged to close first bus electronically controlled switch 410 and open second bus electronically controlled switch 420. As described above, control unit 440 is further arranged to close electronically controlled switch 430 and open electronically controlled switch 435. The non-inverting input of current sense error amplifier 390 sees the output of current sense amplifier 380 of each current sharing module 125 associated with a CPE 40, via the respective resistor 330, on bus 415. The common connection of resistors 330 thus presents the non-inverting input of current sense error amplifier 390 with the average of the outputs of current sense amplifiers 380 associated with CPEs 40. Therefore, the output of the present current sense amplifier 380 is compared with the average of the outputs of current sense amplifiers 380 associated with CPEs 40, which represents a comparison between the magnitude of the current generated by secondary winding 176 of the present Power transfer circuits 110 and the average of the magnitudes of currents generated by secondary windings 176 of all power transfer circuits 110 providing DC power from CPEs 40. In the event that the present current magnitude is greater than the average, the output of current sense error amplifier 390 decreases, thereby reducing voltage VREF output by reference voltage source 240. As a result, the output of error amplifier 230 decreases, thereby reducing the on time of the respective electronically controlled switch 180. In the event that the present current magnitude is less than the average, the output of current sense error amplifier 390 increases, thereby increasing voltage VREF output by reference voltage source 240. As a result, the output of error amplifier 230 increases, thereby increasing the on time of the respective electronically controlled switch 180. The operation of power balancing/control circuit 120 thus causes the amount of current supplied by each transformer 170 receiving power from CPEs 40 to be equal to each other.

In the event that the DC power is being supplied by a CPE 45, control unit 440 is arranged to close second bus electronically controlled switch 420 and open first bus electronically controlled switch 410. As described above, control unit 440 is further arranged to open electronically controlled switch 430 and open electronically controlled switch 435. The non-inverting input of current sense error amplifier 390 sees the output of buffer 480. The common connection of resistors 340 presents the average of the outputs of current sense amplifiers 380 associated with CPEs 45, which is divided by resistors 460 and 470. Therefore, the output of the present current sense amplifier 380 is compared with a fraction of the average of the outputs of current sense amplifiers 380 associated with CPEs 45. As a result, the amount of current supplied by each transformer 170 receiving power from CPEs 45 are controlled to be equal to each other, but less than the amount of current supplied by each transformer 170 receiving power from CPEs 40 due to the voltage division of resistors 460 and 470. Particularly, the non-inverting input of current sense amplifier 390 is provided with a smaller voltage, due to the voltage division of resistors 460 and 470, therefore the current generated by the respective secondary windings 176 associated with CPEs 45 will be maintained at a smaller value than those associated with CPEs 40.

Control unit 440 is arranged to compare the voltage at the common node of resistors 330, i.e. the average of the representations of the currents of secondary windings 176, to a predetermined maximum reference value denoted VREFMAX. In the event that the representation average is less than predetermined maximum reference voltage VREF-MAX, control unit 440 is arranged to reduce the resistance of variable resistor 470. As a result, the fraction of the representation average, associated with CPEs 45, being presented to current sense amplifier 390 via second bus electronically controlled switch 420, i.e. to the current sense amplifiers 390 associated with CPEs 45, is reduced. Therefore, the output of each of the respective current sense amplifiers 390 decreases, thereby decreasing voltage VREF of the respective reference voltage source 240 and reducing the on time of the respective electronically controlled switch 180 to reduce the amount of current generated at the respective secondary winding 176. As the amount of power being drawn from CPEs 45 decreases, the amount of power being drawn from CPEs 40 increases until reaching the maximum amount allowed in accordance with the respective PoE protocols, represented by predetermined maximum reference voltage VREFMAX.

As described above in relation to EQ. 1, the maximum allowable amount of power is drawn from CPEs 40 which are receiving power from a first type power source, such as an AC power mains. The difference between the amount of power supplied by CPEs 40 and the amount of power needed to power MDU 50 is supplied by CPEs 45 which are receiving power from a second type power source, such as a DC battery. The amount of power being drawn from CPEs 45 is thus less than the maximum allowable amount according to the respective protocol, thereby reducing the power drain thereon.

Figure 4:
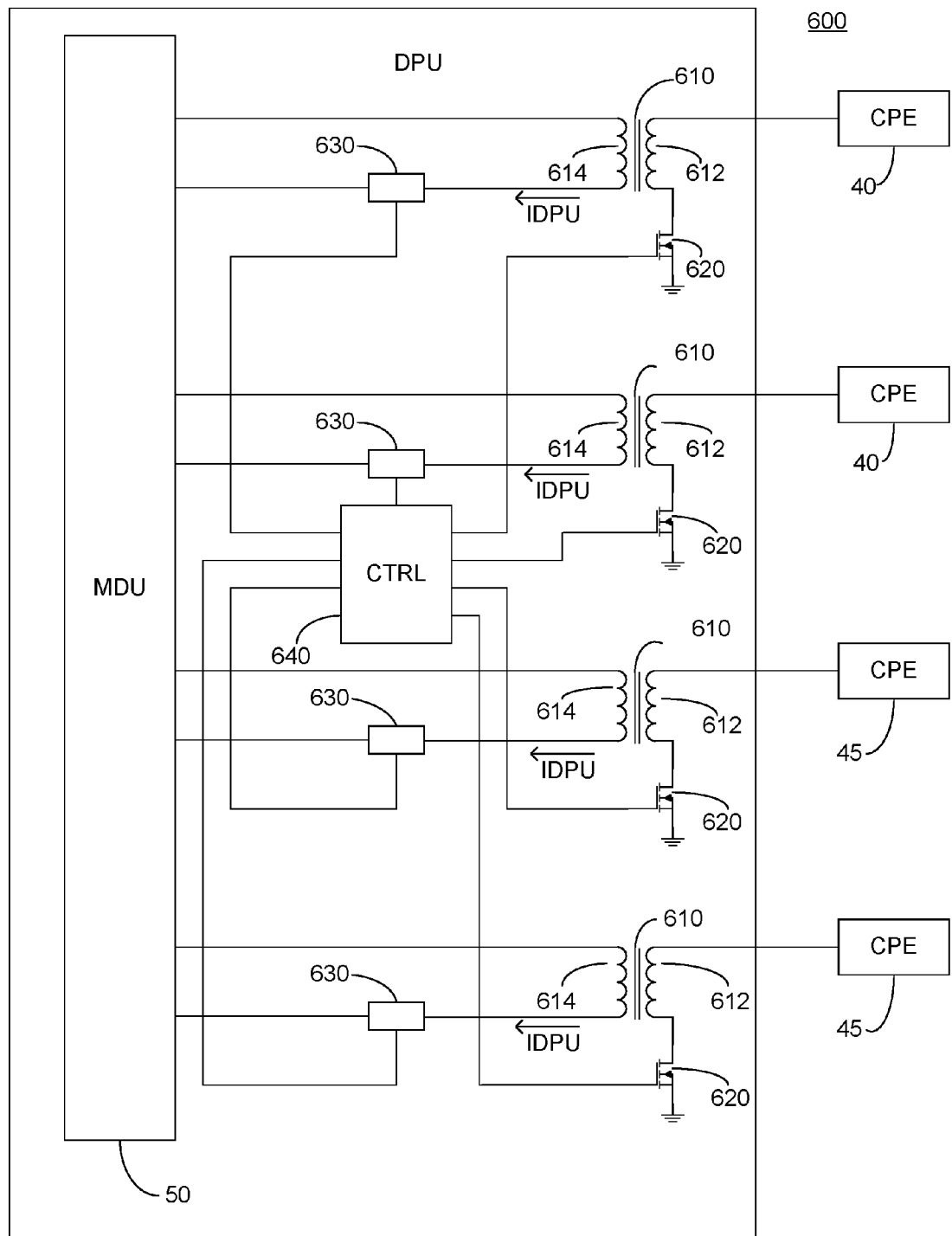
FIG. 4 illustrates a high level block diagram of a third embodiment of a reverse power feeding system, according to certain embodiments.

FIG. 4 illustrates a high level schematic diagram of a reverse power feeding system 600 comprising: a plurality of transformers 610, each comprising a primary winding 612 and a secondary winding 614 magnetically coupled to primary winding 612; a plurality of electronically controlled switches 620; a plurality of current magnitude sensors 630; and a control circuitry 640. A first end of each primary winding 612 is coupled to a respective one of a plurality of CPEs 40, 45. A second end of each primary winding 612 is coupled to a first terminal of a respective electronically controlled switch 620 and a second terminal of each electronically controlled switch 620 is coupled to a common potential. A control terminal of each electronically controlled switch 620 is coupled to a respective output of control circuitry 640. A first end of each secondary winding 614 is coupled to an MDU 50 and a second end of each secondary winding 614 is coupled to MDU 50, via a respective current magnitude sensor 630. Each current magnitude sensor 630 is coupled to a respective input of control circuitry 640. In one embodiment, current magnitude sensor 630 comprises a sense resistor.

In operation, as described above, CPEs 40, 45 are arranged to provide power to MDU 50. Current is received at each primary winding 612 and a corresponding current is generated in the associated secondary winding 614 responsive to the alternating open and closed states of the respective electronically controlled switch 620, the current denoted IDPU. Control circuitry 640 is arranged to receive from current magnitude sensor 630 a representation of the magnitude of the current IDPU generated in each secondary winding 614. Responsive to the received current magnitude representations associated with CPEs 40, control circuitry 640 is arranged to control each electronically controlled switch 620 associated with CPEs 45 to reduce the magnitude of the current IDPU generated in the respective secondary windings 614 as compared to the magnitude of the current IDPU associated with CPEs 40.

In one embodiment, control circuitry 640 is arranged to determine the sum of the magnitudes of currents IDPU generated in secondary windings 614 associated with CPEs 40, denoted SUM40. In the event that SUM40 is less than a predetermined value, current IDPU is generated in each of secondary windings 614 associated with CPEs 45. In the event that SUM40 is not less than the predetermined value, current IDPU is not generated in each of secondary windings 614 associated with CPEs 45. The predetermined value is representative of the amount of current necessary to provide sufficient amount of power to MDU 50. Thus, in the event that CPEs 40 provided sufficient amount of power, CPEs 45 are not utilized, as described above. In one embodiment, as described above in relation to EQ. 1, CPEs 45 are arranged to provide only the difference between the amount of power needed by MDU 50 and the total amount of power supplied by CPEs 40.

FIG. 5 illustrates a high level flow chart of a first reverse power feeding method for supplying power from a plurality of first devices to a second device, a first set of the plurality of first devices each being powered by a first type power source and a second set of the plurality of first devices each being powered by a second type power source different than the first type power source, according to certain embodiments. In one embodiment, each of the first devices comprises a CPE and the second device comprises a DPU. In another embodiment, the first type power source comprises an AC power mains and the second type power source comprises a reserve power supply, such as a DC battery. Particularly, a CPE which is located in a customer premises which has AC mains power is being powered by the first type power source and a CPE which is located in a customer premises which has a power outage is being powered by the second type power source.

In stage 1000, a representation of the magnitude of current generated within each secondary winding of a plurality of transformers, associated with the first set of first devices, is received. Each secondary winding is in electrical communication with a second device. In one embodiment, each of the first devices comprises a CPE and the second device comprises a DPU, particularly an MDU to be powered, such as a G.fast controller, without limitation. In another embodiment, the first type power source comprises an AC power mains.

In stage 1010, responsive to the received current magnitude representations of stage 1000, an electronically controlled switch associated with the primary winding of each of the transformers of stage 1000, associated with a second set of first devices, is controlled to alternately switch between an open and closed state such that the magnitude of current generated within the respective secondary windings is reduced. The second set of first devices are each powered by a second type power source. In one embodiment, the second type power source comprises a reserve power source, such as a DC battery.

In optional stage 1020, in the event that the sum of the magnitudes of currents generated in the secondary windings of the transformers of stage 1000 associated with the first set of first devices is less than a predetermined value, current is generated in each of the secondary windings of the transformers associated with the second set of first devices. Additionally, in the event that the sum of the magnitudes of currents generated in the secondary windings of the transformers of stage 1000 associated with the first set of first devices is not less than the predetermined value, current is not generated in each of the secondary windings of the transformers associated with the second set of first devices. Thus, as described above, in the event that the amount of power supplied by the first set of first devices is sufficient to power the second device, no power is drawn from the second set of first devices. Optionally, as described above in relation to EQ. 1, the sum of the magnitudes of currents generated in the secondary windings associated with the second set of first devices is arranged to be substantially equal to the difference between the magnitude of current needed by the second device and the sum of the sum of the magnitudes of currents generated in the secondary windings associated with the first set of first devices. As indicated above the second device is typically a DPU, with power being particularly required by the MDU thereof.

In optional stage 1030, the currents in the secondary windings of stage 1010, associated with the second set of first devices, are balanced to be substantially equal to each other. Optionally, the balancing is responsive to a comparison of the current magnitude in each secondary winding associated with the second set of first devices with the average current magnitude in the secondary windings associated with the second set of first devices.

In optional stage 1040, the currents in the secondary windings of stage 1000, associated with the first set of first devices, are balanced to be substantially equal to each other. Optionally, the balancing is responsive to a comparison of the current magnitude in each secondary winding associated with the first set of first devices with the average current magnitude in the secondary windings associated with the first set of first devices.

Figure 6:
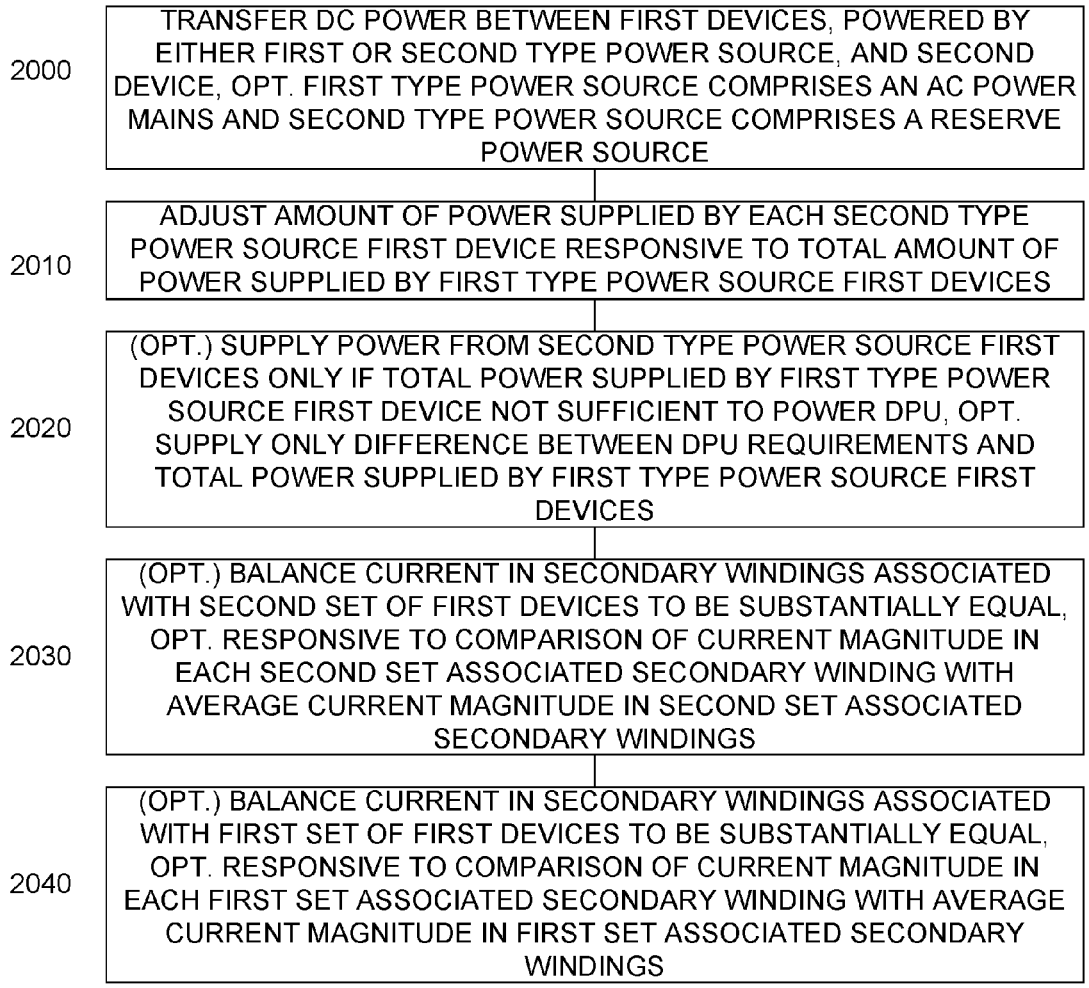
FIG. 6 illustrates a high level flow chart of a second reverse power feeding method, according to certain embodiments.

FIG. 6 illustrates a high level flow chart of a second reverse power feeding method, a first set of the plurality of first devices each being powered by a first type power source and a second set of the plurality of first devices each being powered by a second type power source different than the first type power source, according to certain embodiments. In one embodiment, each of the first devices comprises a CPE and the second device comprises a DPU. In another embodiment, the first type power source comprises an AC power mains and the second type power source comprises a reserve power supply, such as a DC battery. Particularly, as described above, a CPE which is located in a customer premises which has power is being powered by the first type power source and a CPE which is located in a customer premises which has a power outage is being powered by the second type power source.

In stage 2000, DC power is transferred between a respective one of the plurality of first devices and the second device. In one embodiment, the DC power is provided over twisted data wire pairs according to an appropriate reverse power feeding protocol, the DC power extracted from the twisted data wire pairs by an appropriate circuit. In stage 2010, the amount of power supplied by each of the second set of the plurality of first devices is adjusted responsive to the total amount of power supplied by the first set of the plurality of first devices. In one embodiment, the power is transferred via a DC/DC converter, the on/off ratio of an electronically controlled switch of the DC/DC converter adjusted so as to adjust the amount of power being supplied from the associated first device. Optionally, an indication is received indicating which of the plurality of first devices belong to the first set, i.e. are powered by the first type power source, and which of the plurality of first devices belong to the second set, i.e. are powered by the second type power source.

In optional stage 2020, in the event that the total amount of power supplied by the first set of first devices is not sufficient to power the second device, power is supplied to the second device by the second set of first devices, in addition to the power supplied by the first set of first devices.

In the event that the total amount of power supplied by the first set of first devices is sufficient to power the second device, power is supplied to the second device by the first set of first devices and not by the second set of first devices. As described above, this prevents unnecessarily draining power from the reserve power supply of each of the second set of first devices during a power outage. Optionally, as described above in relation to EQ. 1, only the difference between the amount power needed by the second device and the total amount of power supplied by the first type power source first devices is supplied by the second type power source first devices. As indicated above the second device is typically a DPU, with power being particularly required by the MDU thereof.

In optional stage 2030, the DC power of stage 2000, supplied by each of the second set of the plurality of first devices, are balanced to be substantially equal to each other. Optionally, the balancing is responsive to a comparison of a representation of the amount of power supplied by each of the second set of first devices with the average amount of power supplied by the second set of first devices.

In optional stage 2040, the DC power of stage 2000, supplied by each of the first set of the plurality of first devices, are balanced to be substantially equal to each other. Optionally, the balancing is responsive to a comparison of a representation of the amount of power supplied by each of the first set of first devices with the average amount of power supplied by the first set of first devices.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A reverse power feeding system for supplying power from a plurality of first devices to a second device, a first set of the plurality of first devices each being powered by a first type power source and a second set of the plurality of first devices each being powered by a second type power source different than the first type power source, the system comprising:
   a plurality of power paths, each of said plurality of power paths arranged to transfer direct-current (DC) power between a respective one of the plurality of first devices and the second device; and
   a control circuitry, said control circuitry arranged to adjust the amount of DC power supplied from each of the second set of the plurality of first devices over the respective power paths responsive to the total amount of DC power supplied from the first set of the plurality of first devices over the respective power paths,
      wherein in the event that the total amount of DC power supplied from the first set of the plurality of first devices is not sufficient to power the second device, said control circuitry is operative so that DC power is further supplied from the second set of the plurality of first devices over the respective power paths, and
      wherein in the event that the total amount of DC power supplied from the first set of the plurality of first devices is sufficient to power the second device, said control circuitry is operative so that DC power is not supplied from the second set of the plurality of first devices over the respective power paths.

2. The system of claim 1, wherein said arrangement of said control circuitry to adjust the amount of DC power supplied from each of the second set of the plurality of first devices over the respective power paths is such that the total amount of DC power supplied from the second set of the plurality of first devices over the respective power paths is substantially equal to the difference between the amount of power needed by the second device and the total amount of DC power supplied from the first set of the plurality of first devices over the respective power paths.

3. The system of claim 1, further comprising a balancer circuitry, said balancer circuitry arranged to:
   balance the DC power supplied from each of the second set of the plurality of first devices to be substantially equal to each other; and
   balance the DC power supplied from each of the first set of the plurality of first devices to be substantially equal to each other.

4. The system of claim 3, wherein said balancer circuitry is further arranged to:
   compare a representation of the amount of DC power supplied from each of the second set of the plurality of first devices with a representation of the average amount of DC power supplied from the second set of the plurality of first devices, said arrangement to balance the DC power supplied from each of the second set of the plurality of first devices responsive to said second set comparison; and
   compare a representation of the amount of DC power supplied from each of the first set of the plurality of first devices with a representation of the average amount of DC power supplied by the first set of the plurality of first devices, said arrangement to balance the DC power supplied from each of the first set of the plurality of first devices responsive to said first set comparison.

5. The system of claim 1, wherein the first type power source comprises an AC power mains, and wherein the second type power source comprises a reserve power source.

6. The system of claim 1, wherein said control circuitry is further arranged to receive an indication of which of the plurality of first devices belong to the first set of the plurality of first devices and which of the plurality of first devices belong to the second set of the plurality of first devices, said arrangement of said control circuitry to adjust the amount of DC power supplied from the second set of the plurality of first devices over the respective power paths responsive to said received indication.

7. A method of reverse power feeding for supplying power from a plurality of first devices to a second device, a first set of the plurality of first devices each being powered by a first type power source and a second set of the plurality of first devices each being powered by a second type power source different than the first type power source, the method comprising:
    enabling the transfer of direct-current (DC) power from each of the plurality of first devices to the second device; and
    adjusting the amount of DC power supplied to the second device from each of the second set of the plurality of first devices responsive to the total amount of DC power supplied to the second device from the first set of the plurality of first devices,
        wherein in the event that the total amount of DC power supplied from the first set of the plurality of first devices is not sufficient to power the second device, further supplying DC power to the second device from the second set of the plurality of first devices, and
        wherein in the event that the total amount of DC power supplied from the first set of the plurality of first devices is sufficient to power the second device, not supplying DC power to the second device from the second set of the plurality of first devices.

8. The method of claim 7, wherein said adjusting the amount of DC power supplied from each of the second set of the plurality of first devices is such that the total amount of DC power supplied from the second set of the plurality of first devices is substantially equal to the difference between the amount of power needed by the second device and the total amount of DC power supplied from the first set of the plurality of first devices.

9. The method of claim 7, further comprising:
    balancing the DC power supplied from each of the second set of the plurality of first devices to be substantially equal to each other; and
    balancing the power supplied from each of the first set of the plurality of first devices to be substantially equal to each other.

10. The method of claim 9, further comprising:
    comparing a representation of the amount of DC power supplied from each of the second set of the plurality of first devices with a representation of the average amount of DC power supplied from the second set of the plurality of first devices, said balancing the DC power supplied from each of the second set of the plurality of first devices responsive to said second set comparison; and
    comparing a representation of the amount of DC power supplied from each of the first set of the plurality of first devices with a representation of the average amount of DC power supplied from the first set of the plurality of first devices, said balancing the DC power supplied from each of the first set of the plurality of first devices responsive to said first set comparison.

11. The method of claim 7, wherein the first type power source comprises an AC power mains, and wherein the second type power source comprises a reserve power source.

12. The method of claim 7, further comprising receiving an indication of which of the plurality of first devices belong to the first set and which of the plurality of first devices belong to the second set, said adjusting the amount of DC power supplied from the second set of the plurality of first devices responsive to said received indication.

13. A reverse power feeding system for supplying power from a plurality of first devices to a second device, a first set of the plurality of first devices each being powered by a first type power source and a second set of the plurality of first devices each being powered by a second type power source different than the first type power source, the system comprising:
    a control circuitry;
    a plurality of transformers, each of said plurality of transformers exhibiting a primary winding and a secondary winding magnetically coupled to said primary winding, said primary winding in electrical communication with a respective one of the plurality of first devices and said secondary winding in electrical communication with the second device; and
    a plurality of electronically controlled switches, each of said plurality of electronically controlled switches in electrical communication with said primary winding of a respective one of said plurality of transformers and arranged to be alternately opened and closed responsive to said control circuitry,
    wherein said control circuitry is arranged to:
        receive a representation of the magnitude of a current generated in said secondary winding of said transformers associated with the first set of the plurality of first devices; and
        responsive to said received current magnitude representations, control each of said electronically controlled switches associated with the second set of the plurality of first devices to reduce the magnitude of a current generated in said associated secondary windings, wherein said magnitude current reduction is such that the sum of the magnitudes of currents generated in said secondary windings associated with the second set of the plurality of first devices is substantially equal to the difference between the current magnitude needed by the second device and the sum of the magnitudes of currents generated in said secondary windings associated with the first set of the plurality of first devices.

14. The system of claim 13, wherein in the event that the sum of the magnitudes of currents generated in said secondary windings associated with the first set of the plurality of first devices is less than a predetermined value, current is generated in each of said secondary windings associated with the second set of the plurality of first devices, and
    wherein in the event that the sum of the magnitudes of currents generated in said secondary windings associated with the first set of the plurality of first devices is not less than said predetermined value, current is not generated in each of said secondary windings associated with the second set of the plurality of first devices.

15. The system of claim 13, further comprising a balancer circuitry, said balancer circuitry arranged to:
    balance the current generated in each of said secondary windings associated with the second set of the plurality of first devices to be substantially equal to each other; and
    balance the current generated in each of said secondary windings associated with the first set of the plurality of first devices to be substantially equal to each other.

16. The system of claim 15, wherein said balancer circuitry is further arranged to:
- compare a representation of the magnitude of current generated in each of said secondary windings associated with the second set of the plurality of first devices with a representation of the average magnitude of current generated in said secondary windings associated with the second set of the plurality of first devices, said arrangement to balance the current generated by each of said secondary windings associated with the second set of the plurality of first devices responsive to said second set comparison; and
- compare a representation of the magnitude of current generated in each of said secondary windings associated with the first set of the plurality of first devices with a representation of the average magnitude of current generated in said secondary windings associated with the first set of the plurality of first devices, said arrangement to balance the current generated by each of said secondary windings associated with the first set of the plurality of first devices responsive to said first set comparison.

17. The system of claim 13, wherein the first type power source comprises an AC power mains, and wherein the second type power source comprises a reserve power source.

* * * * *